United States Patent
Åberg (10) Patent No.: US 8,544,024 B2
(45) Date of Patent: Sep. 24, 2013

(54) SYSTEM, PROCESSOR, APPARATUS AND METHOD FOR INTER-PROCESSOR COMMUNICATION

(75) Inventor: Patrik Åberg, Södra Sandby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 610 days.

(21) Appl. No.: 12/667,882

(22) PCT Filed: Jun. 27, 2008

(86) PCT No.: PCT/EP2008/058329
§ 371 (c)(1),
(2), (4) Date: Mar. 29, 2010

(87) PCT Pub. No.: WO2009/007262
PCT Pub. Date: Jan. 15, 2009

(65) Prior Publication Data
US 2011/0173635 A1    Jul. 14, 2011

Related U.S. Application Data

(60) Provisional application No. 60/948,412, filed on Jul. 6, 2007.

(30) Foreign Application Priority Data

Jul. 6, 2007  (EP) .................................. 07111967

(51) Int. Cl.
*G06F 9/44* (2006.01)
*G06F 12/00* (2006.01)

(52) U.S. Cl.
USPC .......................................... 719/312; 711/103

(58) Field of Classification Search
USPC .......................................................... 719/312
See application file for complete search history.

(56) References Cited

U.S. PATENT DOCUMENTS

| | | | |
|---|---|---|---|
| 6,088,777 A | 7/2000 | Sorber | |
| 6,208,650 B1 * | 3/2001 | Hassell et al. | 370/392 |
| 7,003,597 B2 | 2/2006 | Georgiou et al. | |
| 7,035,286 B2 | 4/2006 | Tzeng | |
| 2002/0085551 A1 | 7/2002 | Tzeng | |
| 2004/0042490 A1 * | 3/2004 | Henderson et al. | 370/469 |
| 2005/0254518 A1 * | 11/2005 | Fujimori | 370/466 |

* cited by examiner

*Primary Examiner* — S Sough
*Assistant Examiner* — Abdou Seye
(74) *Attorney, Agent, or Firm* — Coats & Bennett, P.L.L.C.

(57) ABSTRACT

A multi-processor system comprises a sending processor adapted to send a data message, a receiving processor adapted to receive the date message, and a memory unit associated with the receiving processor. The multi-processor system has a size-index table associated with the sending processor, and the sending processor is adapted to map a size of a payload portion of the data message to an index of the size-index table, and to send the data message containing the size, the index and the payload portion to the receiving processor. The multi-processor system also has mapping circuitry associated with the receiving processor. The mapping circuitry is adapted to the map the index contained in the data message received from the sending processor to a pointer, wherein the pointer is associated with a buffer of the memory unit. The receiving processor is adapted to write the payload portion of the received data message to the buffer as indicated by the pointer. A receiving processor adapted to be comprised in a multi-processor system, an electronic apparatus comprising a multi-processor system and/or a receiving processor are also described as well as a method of receiving a data message at a processor.

26 Claims, 4 Drawing Sheets

SYSTEM, PROCESSOR, APPARATUS AND METHOD FOR INTER-PROCESSOR COMMUNICATION

TECHNICAL FIELD

The present invention relates to the field of digital processors, and in particular to the communication between digital processors in multi-processor systems.

BACKGROUND

Inter-processor communication is frequently used in multi-processor systems. Multi-processor systems may reside on a single chip, such as, for example, an application-specific integrated circuit (ASIC). Alternatively, multi-processor systems may be made up by processors that reside on different chips in an electronic device or even by processors residing in separate devices, possibly geographically separated. The processors of a multi-processor system may be standard, off-the-shelf processors, or they may be special purpose processors specifically designed for certain tasks or conditions.

Each processor of a multi-processor system may have an operating system running on it. The cores of the operating systems need to communicate in a way that is transparent to the applications running on the respective operating systems. Inter-processor communication may for example involve a data message that needs to be transferred from a memory unit associated with a first one of the processors in the multi-processor system to a memory unit associated with a second one of the processors in the multi-processor system. The need for transferring the data message may, for example, be initiated by a thread associated with the second processor if the thread is using a service on the first processor Generally speaking, the data message to be transferred comprises a payload portion, i.e. the data that needs to be communicated. The payload portion is of a particular size, which may be expressed, for example, in a number of bytes. The size of the payload portion may vary between different messages that need to be communicated. Since the size may vary and the processor that is to receive the data message has to support reception of messages of all possible sizes, may not be advantageous to have a pre-allocated fixed-size buffer in the memory unit associated with the receiving processor for storing of the received data message. This is because such a solution generally results in a large amount of so-called slack, that is, unused memory that is spread out over the memory unit.

Consequently, the receiving processor (or the receiving processor sub-system) needs to get information regarding the size of the message to be able to allocate a buffer of appropriate size prior to receiving the payload portion of the message. This information may be transmitted by the sending processor prior to transmitting the payload portion. The reception of the size information may generate an interrupt signal in the receiving processor. Then, in response to the interrupt signal, the receiving processor recognizes the size and allocates a buffer of appropriate size in the memory unit associated with the receiving processor. In some implementations, a second interrupt signal is generated in the receiving processor when the buffer has been allocated.

When the buffer has been allocated, the payload can be received and stored in the allocated buffer. For example, the payload can be received and stored in response to the second interrupt signal or as part of executing the procedure in response to the first interrupt signal. When the storing of the payload of the data message in the buffer is completed, yet another interrupt signal may be generated in the receiving processor. This interrupt signal has the purpose of informing the receiving processor central processing unit (CPU) that the data message has been received and stored. This entire procedure has to be repeated for each data message that needs to be communicated between processors of the multi-processor system.

A high frequency of interrupt signals in a processor of a multi-processor system constitutes a severe disadvantage in many situations. For each interrupt signal, a number of steps, such as enter, execute and exit operations, have to be executed by the operating system that runs on that particular processor even when the interrupt signal conveys a fairly simple interrupt request such as, for example, a key stroke or an external hardware request. When the interrupt signal conveys a more complicated interrupt request such as, for example, a nested interrupt there may be even more steps to execute by the operating system.

Thus, the frequency of interrupt signals may have large influence on the performance of processors in, for example, multi-processor systems. Lowering the frequency of interrupt signals may shorten the overall execution time of tasks performed by the operating system running on a processor. In particular when a multi-processor system resides on a single chip, it may be expected that the message transfer should be executed at very high speed, and hence lowering the number of interrupts needed for an inter-processor message transfer would be particularly desirable in such cases, although it would be advantageous in all multi-processor systems.

Another problem encountered in multi-processor systems is when data intended for a particular position in a memory unit may be written to another, unsuitable or erroneous, position in the memory unit or even in another memory unit. Such events may, for example, be the result of hacking, viruses or poorly written code. Furthermore, a hacking or virus attack may write its own data in a memory unit. In all such cases, a subsequent read access may result in completely different data than was intended.

A further disadvantage of some multi-processor systems is when a protocol, such as a shared memory protocol, is used in which memory pointers are exchanged between different processors. In such solutions, there is a risk that e.g. a virus or hacker may tap into the connection, read the pointer, and use the memory address indicated by the pointer to download data or to download and run code on the receiving processor. Alternatively, a virus or hacker may alter the pointer and thereby cause the intended data to be written in an erroneous memory location.

Thus, there is a need for communicating a data message between processors in a multi-processor system while generating as few interrupt signals as possible in the receiving processor and as little slack as possible in a memory unit associated with the receiving processor. Furthermore, there is a need to prevent illegal or unwanted memory use in a multi-processor system.

SUMMARY

It is an object of the invention to obviate at least some of the above disadvantages and to provide improved systems, processors, apparatuses and methods for communicating a data message between processors in a multi-processor system.

According to a first aspect of the invention, this is achieved by a multi-processor system comprising a sending processor adapted to send a data message, a receiving processor adapted to receive the data message, and a memory unit associated with the receiving processor. The multi-processor system has a size-index table associated with the sending processor, and the sending processor is adapted to map a size of a payload portion of the data message to an index of the size-index table, and to send the data message containing the size, the index and the payload portion to the receiving processor. The multi-processor system also has mapping circuitry associated with the receiving processor. The mapping circuitry is adapted to map the index contained in the data message received from the sending processor to a pointer, wherein the pointer is associated with a buffer of the memory unit. The receiving processor is adapted to write the payload portion of the received data message to the buffer as indicated by the pointer.

The receiving processor may be further adapted to set up the size-index table at system start-up.

The multi-processor system may further comprise a direct memory access controller associated with the receiving processor, and adapted to execute scatter chains comprising at least one peripheral-to-memory transfer and at least one memory-to-memory transfer.

The multi-processor system may further comprise a data link associated with the sending processor and the receiving processor. The sending processor may comprise an output buffer associated with the data link and the receiving processor may comprise an input buffer associated with the data link.

The mapping circuitry may comprise a pointer array for storing pointers, an index register, and a pointer register.

The receiving processor may be further adapted to set up the pointer array at system start-up.

The direct memory access controller may be adapted to allocate buffers of the memory unit, and to update the pointer array when a buffer of the memory unit has been allocated.

The input buffer of the receiving processor may be adapted to receive the data message containing the size, the index, and the payload portion. The direct memory access controller may be further adapted to read the size from the input buffer, read the index from the input buffer, write the index to the index register, read the pointer, associated with the buffer of the memory unit, from the pointer register, read the payload portion from the input buffer, and write the payload portion to the buffer as indicated by the pointer.

The direct memory access controller may be further adapted to generate an interrupt signal when the payload portion has been written to the buffer.

The direct memory access controller may be further adapted to pass the buffer to a higher layer of a system stack, and send an acknowledgement message to the sending processor.

The buffer may be a first buffer, and the direct memory access controller may be further adapted to allocate a second buffer of the memory unit, wherein the second buffer has the same size as the first buffer, and update the pointer array with a pointer associated with the second buffer.

The memory unit may be a first memory unit and the multi-processor system may further comprise a second memory unit associated with the sending processor. The second memory unit may be adapted to store the size-index table.

According to a second aspect of the invention, a processor is adapted to be comprised in a multi-processor system. The processor is a receiving processor adapted to receive a data message containing a payload portion, a size of the payload portion, and an index. The multi-processor system further comprises a sending processor, adapted to send the data message, and a memory unit associated with the receiving processor. The processor has mapping circuitry adapted to map the index contained in the data message received from the sending processor to a pointer, wherein the pointer is associated with a buffer of the memory unit. The receiving processor is adapted to write the payload portion of the received data message to the buffer as indicated by the pointer.

Furthermore, the processor according to the second aspect may have features corresponding to the various features of embodiments according to the first aspect.

According to a third aspect of the invention, an electronic apparatus comprises at least one of a multi-processor system according to the first aspect, and a processor according to the second aspect.

The electronic apparatus may be a portable or handheld mobile radio communication equipment, a mobile radio terminal, a mobile telephone, a pager, a communicator, an electronic organizer, a smartphone, a computer, an embedded drive, a mobile gaming device, a watch, a base station, or a base station controller.

According to a fourth aspect of the invention, a method of receiving a data message at a processor, wherein the data message contains a size, an index, and a payload portion, comprises reading the size from an input buffer of the processor, reading the index from the input buffer, mapping the index to a pointer, reading the payload portion from the input buffer, and writing the payload portion to a buffer of a memory associated with the processor, wherein the buffer is indicated by the pointer.

The pointer may be comprised in a pointer array.

The step of mapping the index to a pointer may comprise writing the index to an index register, mapping the index to the pointer, writing the pointer to a pointer register, and reading the pointer from the pointer register.

Furthermore, the method according to the fourth aspect may have features corresponding to the various features of embodiments according to the first aspect.

Further embodiments of the invention are defined in the dependent claims.

One of the advantages of embodiments of the invention is that the number of interrupt signals generated in a processor when the processor receives a data message from another processor is reduced. More precisely, the number of interrupt signals associated with the reception of a data message may be at least halved, and even divided by three in comparison to some implementations.

A further advantage of embodiments of the invention is that there may be a built-in security mechanism that prevents illegal and/or unwanted memory use.

Another advantage of embodiments of the invention is that no memory pointers are sent between processors of a multi-processor system, which increases security against unwanted code, such as viruses.

Yet another advantage of embodiments of the invention is that, even though memory buffers may be pre-allocated according to embodiments of the invention to enable a reduction of the number of interrupt signals, the amount of unused memory spread out over the memory unit, so called slack, may still be kept at a very low level.

It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Further objects, features and advantages of the invention will appear from the following detailed description of embodiments of the invention, with reference being made to the accompanying drawings, in which.

DETAILED DESCRIPTION

Figure 1:
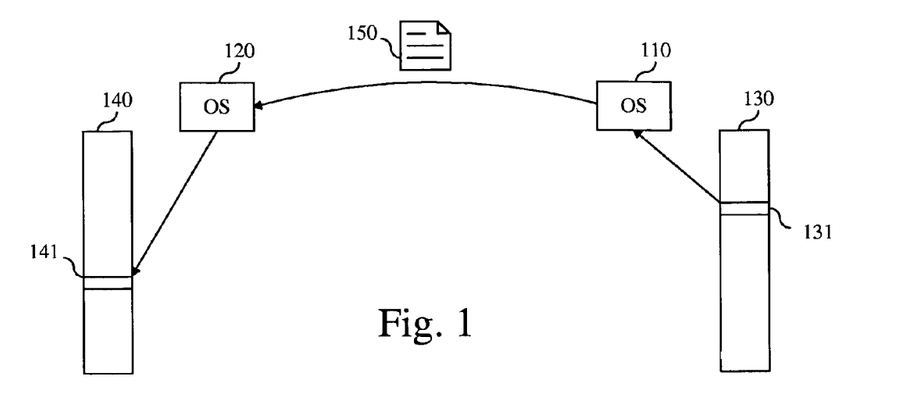
FIG. 1 is a diagram illustrating communication between two operation systems of a multi-processor system.

In the following, embodiments of the invention will be described in which a data message is communicated between two processors of a multi-processor system. FIG. 1 illustrates communication between two operation systems of such a multi-processor system. In FIG. 1, a message 150 is communicated by a first operating system (OS) 110 that runs on a first processor of the multi-processor system, to a second operating system (OS) 120, that runs on a second processor of the multi-processor system. The first operating system fetches the payload of the data message 150 from a location 131 of a memory unit 130 associated with the first processor and communicates it to the second operating system 120. The second operating system 120 receives the data message 150 and stores the payload to a location 141 of a memory unit 140 associated with the second processor.

Figure 2:
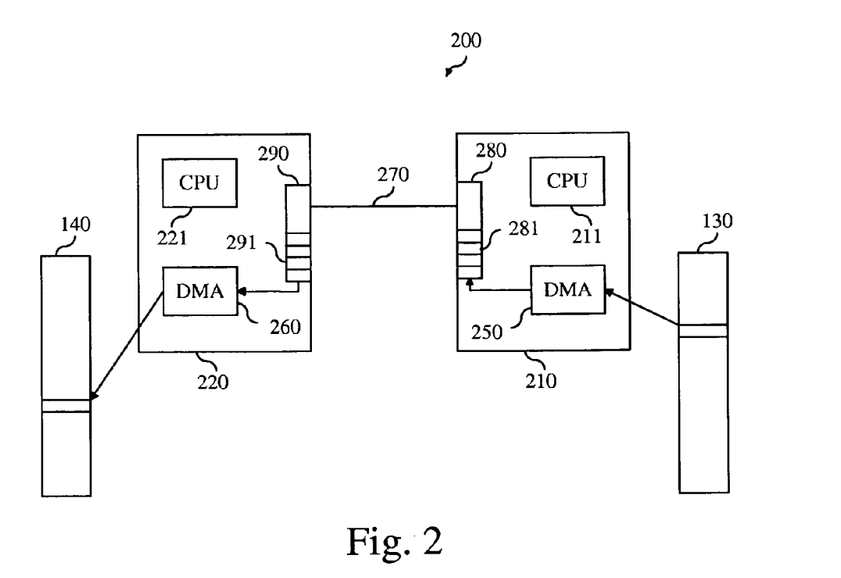
FIG. 2 is a block diagram illustrating a multi-processor system according to some embodiments of the invention.

FIG. 2 shows a block diagram of a multi-processor system 200 according to example embodiments of the invention. The first and second operating systems 110 and 120 of FIG. 1 may for example run on processors 210 and 220, respectively. To simplify the following description, processor 210 will be denoted sending processor and processor 220 will be denoted receiving processor. It will be understood, though, that in embodiments of the invention a processor of a multi-processor system may act both as a sending and as a receiving processor. Furthermore it is understood that a multi-processor system according to embodiments of the invention may comprise two or more processors, and that the embodiments described herein may apply to all pairs of processors in a multi-processor system.

Each of the sending and receiving processors comprises a central processing unit (CPU) 211, 221. A direct memory access (DMA) controller 250 and a predefined interface 280 are associated with the sending processor 210. The interface 280 has an associated queue 281, such as, for example, a first-in first-out (FIFO) shift register. Further, the sending processor 210 has an associated memory unit 130, the access to which is controlled by the direct memory access controller 250. Similarly, the receiving processor 220 has an associated direct memory access (DMA) controller 260, an associated memory unit 140, the access to which is controlled by the direct memory access controller 260, and an associated predefined interface 290, where the interface 290 has an associated queue 291, such as, for example, a first-in first-out (FIFO) shift register. The direct memory access controller 260 associated with the receiving processor is capable of executing scatter chains where peripheral-to-memory and memory-to-memory transfers can be mixed in the same scatter chain. The interfaces 280, 290 are connected through a data link 270, which may be, but is not limited to, a serial link bus. The data link 270 may be managed by a link handler (not shown).

Figure 3A:
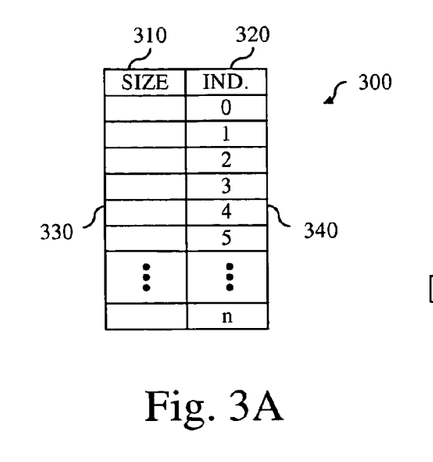
FIG. 3A is a block diagram illustrating a size-index table according to some embodiments of the invention.

FIG. 3A illustrates a size-index table 300 according to embodiments of the invention. The size-index table 300 comprises an array 310 of sizes 330 and a corresponding array 320 of indices 340. In the table, each size 330 has a corresponding index 340 and vice versa. It should be understood that, when used herein, the terms "array" and "table" are to be interpreted in a wide manner. For example, it is understood that the "table" may simply comprise a vector of sizes. Then, the indices are identical to the positions of the respective sizes in the vector. Furthermore, the sizes and indices of the size-index table may, for example, be embodied as a separate hardware unit, as hardware circuitry integral to a processor, or as software data stored in a memory unit.

Reference is now made to FIGS. 2 and 3A. In embodiments of the invention, the size-index table 300 may be associated with the sending processor 210. As an example, the size-index table 300 may be set up at system start-up by the receiving processor 220. The size-index table may be set up by the software of the receiving processor 220. In this set-up procedure, the receiving processor 220 determines a number of buffer sizes 330 that are appropriate for the memory unit 140 associated with the receiving processor 220, arranges these sizes in an array and associates an index 340 to each size to produce the size-index table 300. Then, the receiving processor 220 communicates the table 300 to the sending processor 210, which, for example, stores the table in the memory unit 130. Alternatively, the size-index table may be predetermined and, for example, hard-coded into therefore dedicated hardware. In some embodiments of the invention, the receiving processor 220 also keeps a copy of the size-index table 300, for example in the memory unit 140.

Figure 3B:
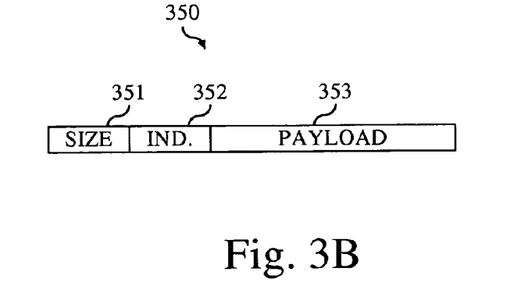
FIG. 3B is a diagram illustrating a data message to be transferred between two processors of a multi-processor system according to some embodiments of the invention.

FIG. 3B illustrates a data message 350 to be transferred between the sending processor 210 of FIG. 2 and the receiving processor 220 of FIG. 2. Referring again to FIGS. 2 and 3A in addition to FIG. 3B, embodiments of the invention will be further elaborated on. When the message payload 353 is to be communicated from the sending processor 210 to the receiving processor 220, the sending processor 210 associates the message 350 with an index 352 by using the size-index table 300. The association is done by mapping the size 351 of the payload portion 353 of the message 350 to a corresponding index 352, 340 and inserting the index into the message 350. Then, the data message 350 may contain the size 351 and the index 352 in addition to the payload 353 as illustrated in FIG. 3B.

The sizes 330 in the size-index table 300 should be able to handle all possible sizes 351 of the payload portion 353 of a message 350 to be communicated between the sending processor 210 and the receiving processor 220. If the payload portion 353 of a message 350 to be communicated has a size 351 that does not directly correspond to a size 330 of an entry in the size-index table 300, an index 340 is chosen that corresponds to a larger size 330 in the size-index table 300, for example, the smallest size 330 in the size-index table 300 that is larger than the size 351 of the payload portion 353 of the message 350. Hence, if, for example, the payload portion of a message to be communicated between processors of a multi-processor system may be anything between 1 and 16 bytes, the size-index table must at least have one entry where the associated size is 16 bytes or larger. For example, the size index could comprise the sizes 4, 6, 8, and 16 bytes and the corresponding indices 0, 1, 2, and 3. If a message to be transmitted has a payload portion with a size of 7 bytes, the entry in the size-index table that corresponds to a size of 8 bytes (the smallest size in the table that is larger than or equal to 7 bytes) is chosen and the payload size is mapped to the index 2.

When the mapping between size and index has been done at the sending processor 210, the message is transmitted over the data link 270 in a manner defined by the predefined interfaces 280, 290. As illustrated in FIG. 3B, the payload portion 353 is accompanied by the size 351 of the payload portion and the associated index 352. It should be noted that the format illustrated in FIG. 3B is merely an example, and that the message portions might appear in another order in some embodiments of the invention. For example, the index portion and the size portion may be interchanged. The message may also contain additional portions in some embodiments of the invention.

When the message 350, or at least part of the message 350, has been transferred to the input queue 291 of the receiving processor 220, the direct memory access controller 260 of the receiving processor reads the size 351 and the index 352 from the queue. The order of reading these message portions depends on the message format and on how the queue is administrated. In any case, the index 352 is mapped to a pointer that is associated with a pre-allocated buffer in the memory unit 140. Then, the direct memory access controller 260 reads the payload portion 353 of the message from the input queue 291 and writes the payload portion to the pre-allocated buffer as indicated by the pointer. The amount of data to be read and written in these read and write procedures is determined by the size 351 previously read from the input queue.

Figure 4A:
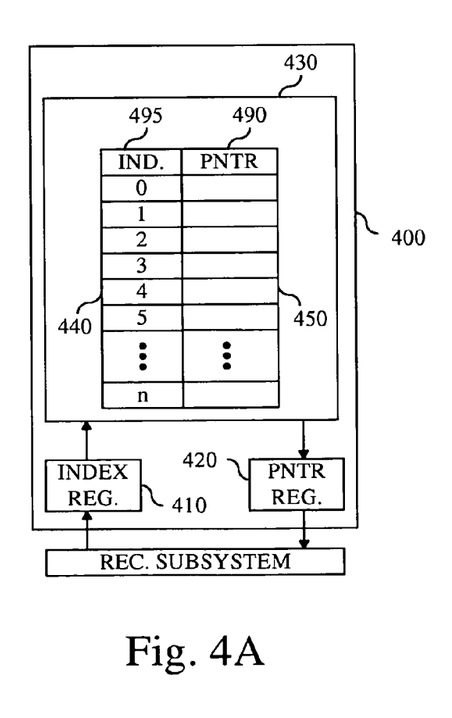
FIG. 4A is a block diagram illustrating an index-pointer mapping circuitry according to some embodiments of the invention.

The mapping of the index 352 to a pointer will now be described in greater detail with reference to FIGS. 2, 4A and 4B. FIG. 4A illustrates an index-pointer mapping circuitry 400 according to example embodiments of the invention. This mapping circuitry may be accessible for reads and/or writes only from the sub-system of the receiving processor. The mapping circuitry 400 may be implemented as a separate hardware block associated with the receiving processor 220, or it may be an integral part of the receiving processor 220. The mapping circuitry 400 comprises an index-pointer table 430, wherein the index-pointer table 430 comprises an array 495 of indices 440 and a corresponding array 490 of pointers 450. In the table, each index 440 has a corresponding pointer 450 and vice versa. As for the size-index table described earlier, it should be understood that, when used herein, the terms "array" and "table" are to be interpreted in a wide manner. For example, it is understood that the "table" may simply comprise a vector of pointers. Then, the indices are identical to the positions of the respective pointers in the vector. Furthermore, the indices and pointers of the index-pointer table may, for example, be embodied as a separate hardware unit, as hardware circuitry integral to a processor, or as software data stored in a memory unit.

In the embodiment shown in FIG. 4A the mapping circuitry further comprises an index register 410 and a pointer register 420. When the direct memory access controller 260 of the receiving processor 220 has read the index from the input queue 291, the index is written to the index register 410 of the mapping circuitry 400. The mapping circuitry is configured to find the pointer that corresponds to the index in index register 410 and write this pointer to the pointer register 420 of the mapping circuitry 400, where the pointer may be read by the direct memory access controller 260. The mapping circuitry may handshake the write to the index register 410 so that no further memory access will be made until the pointer is readable from the pointer register 420.

The handshake may, for example, be accomplished such that, after having written the index to the index register 410, the direct memory access controller 260 is not allowed to immediately read from the pointer register 420. Instead, the direct memory access controller 260 has to wait until it is allowed to read from the pointer register 420. The mapping circuitry 400 may, for example, delay its response to the write operation until the pointer register 420 has been updated and is ready to be read from. Alternatively, the mapping circuitry 400 may immediately respond to the write operation, and then produce a separate indication for the direct memory access controller 260 when the pointer register 420 has been updated and is ready to be read from.

As explained before, the pointer read from the pointer register 420 is associated with a buffer of the memory unit 140 where the payload portion of the received data message should be written. The size of the pre-allocated buffer associated with the pointer corresponds to the size that was associated with the same index in the size-index table as the pointer in the index-pointer table.

Figure 4B:
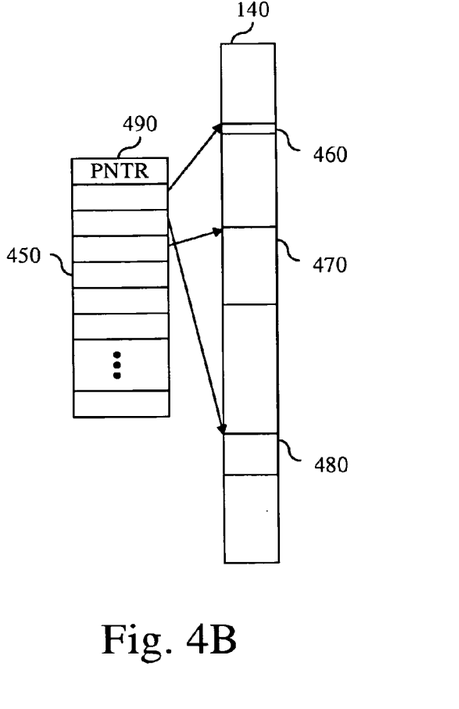
FIG. 4B is a block diagram illustrating the association between buffers of a memory unit and buffer pointers organized in a pointer array according to some embodiments of the invention.

FIG. 4B illustrates the association between the buffer pointers 450 in the pointer array 490 and the pre-allocated example buffers 460, 470, 480 of the memory unit 140. It should be noted that the pointers 450 may be direct pointers (i.e., memory addresses) to the buffers 460, 470, 480 as illustrated in FIG. 4B, but they may also define the buffers 460, 470, 480 indirectly. For example, the pointer 450 may point to a register of a register unit or to a memory location that is different from the buffer location. Then, the register or memory location in turn contains the memory address of a buffer 460, 470, 480. This solution may be advantageous, for example, if the memory addresses of the buffers are longer than the register addresses or the addresses of the memory location that is different from the buffer location. In this way, the amount of local memory needed for storing of the pointer array 490 in the mapping circuitry 400 can be minimized.

When the payload portion of the message has been written to the identified buffer 460, 470, 480 of the memory unit 140, an interrupt signal may be generated in the receiving processor. This interrupt signal has the purpose of informing the receiving processor CPU that the data message has been received and stored. Thus, the number of interrupt signals generated in connection to communicating a message between processors of a multi-processor system may be reduced to one interrupt signal per message when practicing embodiments of the invention. The interrupt signal may trigger the execution of tasks such as, for example, passing the buffer to higher layers of a system stack associated with the receiving processor, allocating a new buffer 460, 470, 480 in the memory unit 140, wherein the new buffer has the same size as the buffer just passed to higher layers, writing a pointer 450 associated with the new buffer to the appropriate entry in the pointer array 490, and sending an acknowledgement message to the sending processor so that the sending processor may free its sending buffer for other purposes.

Referring again to FIGS. 2, 3A, and 4A, the buffers 460, 470, 480 may be allocated at system start-up at the receiving processor 220, possibly in connection to setting up the size-index table 300 and communicating it to the sending processor 210. For each size 330 in the size-index table, a corresponding buffer 460, 470, 480 of that particular size is allocated. Associated with each buffer is a pointer 450, stored in a pointer array 490. The pointer array 490 may also be set up at system start-up. The pointer array may be set up by the software of the receiving processor 220. Then, each time a message is written to one of the buffers 460, 470, 480, a new buffer of the same size may be allocated, and the corresponding entry of the pointer array 490 may be updated with a pointer associated with the new buffer. For the alternative implementation where the pointer 450 points to a register or a memory location, which in turn contains the memory address of the buffer 460, 470, 480, the corresponding entry of the pointer array 490 must not be updated when a new buffer has been allocated. Instead, the corresponding entry of the register unit or memory location may be updated with the address of the new buffer.

It is noted that the procedure of pre-allocating and updating buffers according to embodiments of the invention is performed without introducing unnecessary slack in the memory unit 140. This is in contrast to other systems with pre-allocated buffers. This feature is important since it is quite hard, if not impossible in this software layer, to predict the lifetime of these buffers. Unnecessary slack may be prevented according to embodiments of the invention by the use of a number of buffers of different sizes. There may be a trade-off, though, between the amount of allowable slack and the number of entries in the size-index table 300 (and consequently of the number of entries in the pointer array 490).

Other message transfer solutions may use techniques in which a pointer to the allocated buffer is sent to the sending processor. This opens up for viruses and hackers to download data or code to the buffer. Furthermore, a pointer can be altered by a virus or hacker or by poorly designed code. If the pointer is altered, the intended data may end up anywhere in the memory, possibly even overwriting other data. Thus, the intended data may be untraceable and the overwritten data may be lost. Hence, it is also noteworthy that the solution according to embodiments of the invention has a built-in security mechanism that may prevent such illegal or unwanted memory use. These embodiments avoid sending pointers associated with the message transfer, which makes it harder for e.g. viruses or hackers to download and run code at the receiving processor. Instead, buffer indices are sent according to these embodiments.

Figure 5:
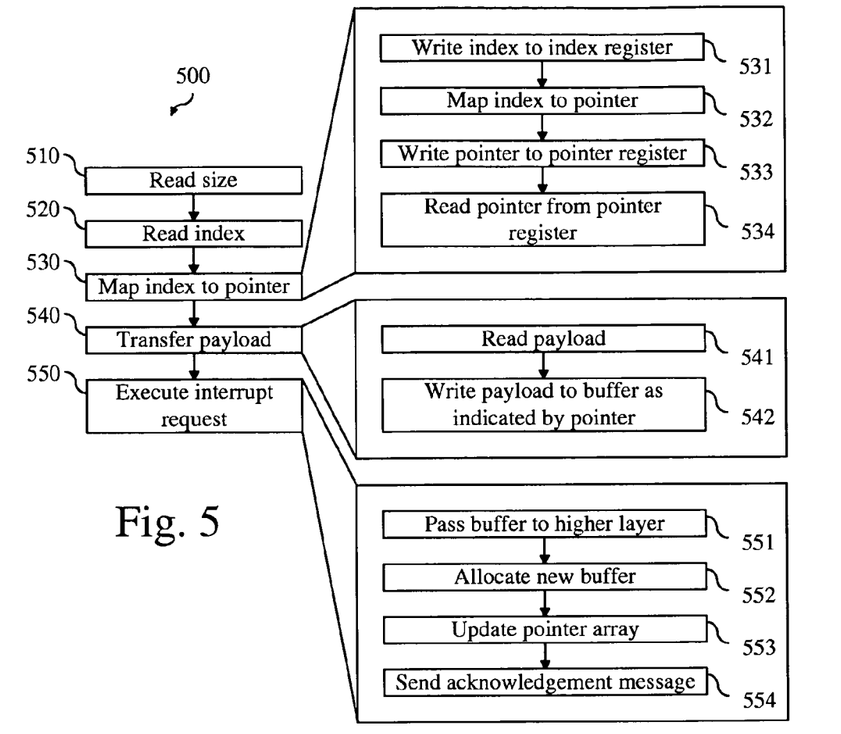
FIG. 5 is a flow diagram illustrating a method of receiving a data message at a processor of a multi-processor system according to some embodiments of the invention.

In FIG. 5 a flow diagram 500 is shown illustrating a method of receiving a data message at a processor of a multi-processor system according to some embodiments of the invention. The method may be performed, for example, in a processor such as the receiving processor 220 in FIG. 2, and the direct memory access controller 260 in FIG. 2 may be responsible for the execution of the method as part of a direct memory access scatter chain operation. The method starts in step 510, where the size of the payload portion of the received data message is read from an input queue of the processor such as the FIFO register 291 of FIG. 2. The index contained in the message is read from the input queue in step 520 and mapped to a pointer in step 530.

The mapping procedure may be performed by writing the index to an index register in step 531, mapping the index to a pointer in step 532, writing the pointer to a pointer register in step 533 and reading the pointer from the pointer register in step 534. As mentioned above, the mapping of the index to a pointer may be realized by reading, from an array of pointers, the entry that corresponds to the index. The array of pointers, the index register and the pointer register may be embodied as the mapping circuitry 400 in FIG. 4A, and mapping of the index to a pointer 532 and writing the pointer to a pointer register 533 may be performed by the mapping circuitry hardware and not by the direct memory access scatter chain.

When the index has been mapped to a pointer, the method continues to step 540, where the payload transfer takes place using the size that was read from the input queue in step 510 and the pointer that was retrieved in step 530. The payload transfer may commence in step 541, where the payload of the data message is read from the input queue. In step 542, the payload transfer may continue by writing the payload to the buffer as indicated by the pointer retrieved in step 530. Method steps 541 and 542 may be pipelined so that a first piece of data is written to the buffer in step 542 while a second piece of data is read from the input buffer in step 541.

When the payload transfer is completed the method may, according to some embodiments of the invention, proceed to step 550 where an interrupt request is executed. The interrupt request may comprise one or several of the steps 551, 552, 553, and 554. In step 551 the buffer that was written to in step 542 is passed to higher layers of a system stack. A new buffer of the same size as the buffer written to in step 542 is allocated in step 552. In step 553, the array of pointers is updated with a pointer associated with the newly allocated buffer. Finally, in step 554, an acknowledgement message is sent to communicate that the message has been fully received and stored.

Figure 6:
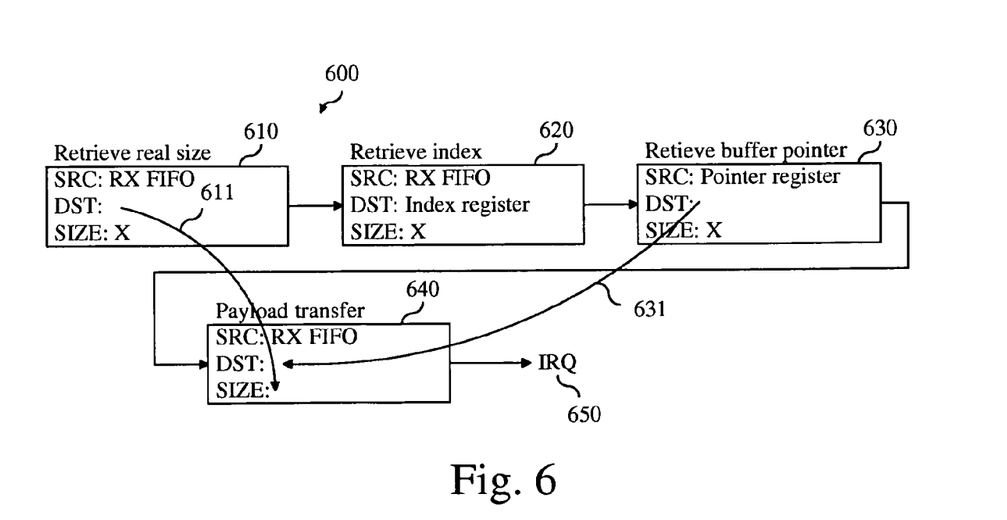
FIG. 6 is a diagram illustrating direct memory access scatter chain operation according to some embodiments of the invention.

FIG. 6 illustrates the operation of a direct memory access scatter chain 600 according to some embodiments of the invention. The operation of scatter chain links 610, 620, 630, and 640 may correspond to the method steps 510, 520, 530, and 540 illustrated in FIG. 5.

In link 610 of the example scatter chain 600, the real size (X) is retrieved from the input buffer 291 (SRC: RX FIFO), and in link 620, the index is retrieved from the input buffer 291 (SRC: RX FIFO). In link 620, the retrieved index is also written to the index register 410 (DST: Index register). In link 630 of the example scatter chain 600, the buffer pointer is retrieved from the pointer register 420 (SRC: Pointer register). It should be noted that link 640 of the example scatter chain is altered by links 610 and 630 that updates link 640 with the retrieved real size and buffer pointer respectively. This is illustrated by arrows 611 and 631. Then, the payload transfer takes place in link 640, in which the payload data of size X is read from the input buffer 291 (SRC: RX FIFO) and written to the buffer as indicated by the buffer pointer.

As can be seen from FIG. 6, the first four scatter links in this example scatter chain are to set up the payload transfer. In this example embodiment, the source pointer and the real size come from the sending processor 210 over the serial link 270. The pointer to the receive buffer, however, comes from the pointer register 420. The buffer pointer is chosen by the mapping circuitry 400 based on the index attached to the stream by the sending processor. After the payload transfer is completed in link 640, a direct memory access interrupt request (IRQ) is executed, 650. As explained above, this interrupt request may pass the buffer to higher layers, allocate a new buffer of the same size, update the pointer array accordingly, and send an acknowledgement message to the sending processor.

The described embodiments of the invention and their equivalents may be performed by general-purpose circuits associated with or integral to a multi-processor system, such as digital signal processors (DSP), central processing units (CPU), co-processor units, or by specialized circuits such as for example application-specific integrated circuits (ASIC) or other integrated circuits (IC). All such forms are contemplated to be within the scope of the invention. The invention may be embodied within an electronic apparatus comprising a multi-processor system or part of a multi-processor system according to any of the embodiments of the invention. The electronic apparatus may, for example, be a portable or handheld mobile radio communication equipment, a mobile radio terminal, a mobile telephone, a pager, a communicator, an electronic organizer, a smartphone, a computer, an embedded drive, a mobile gaming device, or a (wrist) watch. The electronic apparatus may alternatively be a base station or a base station controller in a telecommunication system. The processors of the multi-processor system may reside in a single electronic device and even on a single chip, or they may reside in different devices, possibly geographically separated.

Figure 7:
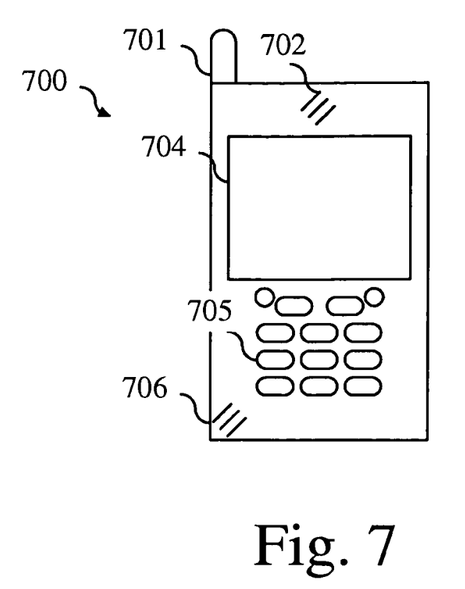
FIG. 7 is a schematic front view of a mobile terminal, which may contain a multi-processor system or parts of a multi-processor system according to some embodiments of the invention.

FIG. 7 illustrates a mobile telephone 700 as an example electronic apparatus that comprises at least part of a multi-processor system as described above. The mobile telephone 700 is illustrated in a schematic front view. This example mobile telephone 700 comprises an antenna 701 mounted on the housing of the apparatus. Alternatively, the mobile telephone 700 may have an internal antenna mounted within the housing of the apparatus. The mobile telephone 700 may further comprise a display 704, a keypad 705, a loudspeaker 702, and a microphone 706, which together provides a man-machine interface for operating the mobile telephone 700.

The mobile telephone 700 is adapted to connect to a mobile telecommunication network via a wireless link to a radio base station. Hence, a user of the mobile telephone 700 may use conventional circuit-switched telecommunication services such as voice calls, data calls, video calls, and fax transmissions, as well as packet-based services such as electronic messaging, Internet browsing, electronic commerce, etc. To this end, the mobile telephone is compliant with a mobile telecommunication standard, for instance GSM (Global System for Mobile communications), GPRS (General Packet Radio Service), EDGE (Enhanced Data rates for GSM Evolution), UMTS (Universal Mobile Telecommunications System), or UMTS LTE (UMTS Long Term Evolution).

The invention has been described herein with reference to various embodiments. However, a person skilled in the art would recognize numerous variations to the described embodiments that would still fall within the scope of the invention. For example, the method embodiments described herein describes the method through method steps being performed in a certain order. However, it is recognized that these sequences of events may take place in another order without departing from the scope of the invention. Furthermore, some method steps may be performed in parallel even though they have been described as being performed in sequence. In the same manner, it should be noted that, in the description of embodiments of the invention, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

Hence, it should be understood that the limitations of the described embodiments are merely for illustrative purpose and by no means limiting. Instead, the invention is construed to be limited by the appended claims and all reasonable equivalents thereof.

The invention claimed is:

1. A multi-processor system comprising:
a sending processor adapted to send a data message;
a receiving processor adapted to receive the data message; and
a memory unit associated with the receiving processor;
a size-index table associated with the sending processor;
a direct memory access controller associated with the receiving processor, and adapted to execute scatter chains comprising at least one peripheral-to-memory transfer and at least one memory-to-memory transfer;
a data link associated with the sending processor and the receiving processor;
the sending processor comprising an output buffer associated with the data link, and being adapted to map a size of a payload portion of the data message to an index of the size-index table, and to send the data message containing the size, the index and the payload portion to the receiving processor;
mapping circuitry associated with the receiving processor, the mapping circuitry comprising:
a pointer array for storing pointers;
an index register; and
a pointer register; and
being adapted to map the index contained in the data message received from the sending processor to a pointer, wherein the pointer is associated with a buffer of the memory unit; and
the receiving processor comprising an input buffer associated with the data link, and being adapted to:
receive the data message containing the size, the index, and the payload portion; and
wherein the direct memory access controller is further adapted to:
read the size from the input buffer;
read the index from the input buffer;
write the index to the index register;
write the pointer to the pointer register;
read the pointer, associated with the buffer of the memory unit, from the pointer register;
read the payload portion from the input buffer; and
write the payload portion to the buffer of the memory unit as indicated by the pointer.

2. The multi-processor system of claim 1, wherein the receiving processor is further adapted to set up the size-index table at system start-up.

3. The multi-processor system of claim 1, wherein the receiving processor is further adapted to set up the pointer array at system start-up.

4. The multi-processor system of claim 1, wherein the direct memory access controller is adapted to allocate buffers of the memory unit, and to update the pointer array when a buffer of the memory unit has been allocated.

5. The multi-processor system of claim 1, wherein the direct memory access controller is further adapted to generate an interrupt signal when the payload portion has been written to the buffer of the memory unit.

6. The multi-processor system of claim 1, wherein the direct memory access controller is further adapted to: pass the buffer of the memory unit to a higher layer of a system stack; and send an acknowledgement message to the sending processor.

7. The multi-processor system of claim 1, wherein the buffer of the memory unit is a first buffer, and wherein the direct memory access controller is further adapted to: allocate a second buffer of the memory unit, wherein the second buffer has the same size as the first buffer; and update the pointer array with a pointer associated with the second buffer.

8. The multi-processor system of claim 1, wherein the memory unit is a first memory unit and the multi-processor system further comprises a second memory unit associated with the sending processor, and wherein the second memory unit is adapted to store the size-index table.

9. The multi-processor system of claim 1, wherein the multi-processor system is included in an electronic apparatus.

10. The multi-processor of claim 9, wherein the electronic apparatus is a portable or handheld mobile radio communication equipment, a mobile radio terminal, a mobile telephone, a pager, a communicator, an electronic organizer, a smartphone, a computer, an embedded drive, a mobile gaming device, a watch, a base station, or a base station controller.

11. A processor adapted to be included in a multi-processor system, wherein the processor is a receiving processor adapted to receive a data message containing a payload portion, a size of the payload portion, and an index, and wherein the multiprocessor system further comprises a sending processor, adapted to send the data message, and a memory unit associated with the receiving processor, said processor comprising:
  mapping circuitry comprising a pointer array for storing pointers, an index register, and a pointer register, and being adapted to map the index contained in the data message received from the sending processor to a pointer, wherein the pointer is associated with a buffer of the memory unit;
  a direct memory access controller adapted to execute scatter chains comprising at least one peripheral-to-memory transfer and at least one memory-to-memory transfer;
  an input buffer associated with a data link, and being adapted to receive the data message containing the size, the index, and the payload portion;
  the receiving processor being adapted to write the payload portion of the received data message to the buffer as indicated by the pointer, and
  wherein the direct memory access controller is further adapted to:
    read the size from the input buffer;
    read the index from the input buffer;
    write the index to the index register;
    write the pointer to the pointer register;
    read the pointer, associated with the buffer of the memory unit, from the pointer register;
    read the payload portion from the input buffer; and
    write the payload portion to the buffer of the memory unit as indicated by the pointer.

12. The processor of claim 11, further adapted to set up a size-index table at system start-up.

13. The processor of claim 11, further adapted to set up the pointer array at system start-up.

14. The processor of claim 11, wherein the direct memory access controller is adapted to allocate buffers of the memory unit, and to update the pointer array when a buffer of the memory unit has been allocated.

15. The processor of claim 11, wherein the direct memory access controller is further adapted to generate an interrupt signal when the payload portion has been written to the buffer of the memory unit.

16. The processor of claim 11, wherein the direct memory access controller is further adapted to: pass the buffer of the memory unit to a higher layer of a system stack; and send an acknowledgement message to the sending processor.

17. The processor of claim 11, wherein the buffer of the memory unit is a first buffer, and wherein the direct memory access controller is further adapted to: allocate a second buffer of the memory unit, wherein the second buffer has the same size as the first buffer; and update the pointer array with a pointer associated with the second buffer.

18. The processor of claim 11, wherein the processor is part of a multi-processor system that is included in an electronic apparatus.

19. The processor of claim 18, wherein the electronic apparatus is a portable or handheld mobile radio communication equipment, a mobile radio terminal, a mobile telephone, a pager, a communicator, an electronic organizer, a smartphone, a computer, an embedded drive, a mobile gaming device, a watch, a base station, or a base station controller.

20. A method of receiving a data message at a processor, wherein the data message contains a size, an index, and a payload portion, the method comprising:
  reading the size from an input buffer of the processor;
  reading the index from the input buffer;
  mapping the index to a pointer, wherein mapping the index to the pointer comprises:
    writing the index to an index register;
    mapping the index to the pointer;
    writing the pointer to a pointer register; and
    reading the pointer from the pointer register;
  reading the payload portion from the input buffer; and
  writing the payload portion to a buffer of a memory associated with the processor,
wherein the buffer of the memory is indicated by the pointer.

21. The method of claim 20, further comprising setting up a size-index table at system start-up, wherein the size of the payload portion of the data message is associated with an index in the size-index table.

22. The method of claim 20, wherein the pointer is comprised in a pointer array.

23. The method of claim 22, further comprising setting up the pointer array at system startup.

24. The method of claim 20, further comprising generating an interrupt signal when the payload portion has been written to the buffer of the memory.

25. The method of claim 20, further comprising: passing the buffer of the memory to a higher layer of a system stack; and sending an acknowledgement message indicating that the data message has been received.

26. The method of claim 20, wherein the buffer is a first buffer and wherein the method further comprises: allocating a second buffer of the memory, wherein the second buffer has the same size as the first buffer; and updating the pointer array with a pointer associated with the second buffer.

* * * * *